(12) United States Patent
Cade

(10) Patent No.: US 7,845,294 B1
(45) Date of Patent: Dec. 7, 2010

(54) GARDEN SEED PLANTING APPARATUS

(76) Inventor: Leland P. Cade, 2110 Mariposa La., Billings, MT (US) 59102

( * ) Notice: Subject to any disclaimer, the term of this patent is extended or adjusted under 35 U.S.C. 154(b) by 0 days.

(21) Appl. No.: 12/647,921

(22) Filed: Dec. 28, 2009

(51) Int. Cl.
  *A01C 7/08* (2006.01)
  *A01C 17/00* (2006.01)

(52) U.S. Cl. .................. 111/130; 111/901; 111/921; 111/922

(58) Field of Classification Search .......... 111/130, 111/11–13, 901, 902, 919, 921, 922
See application file for complete search history.

(56) References Cited

U.S. PATENT DOCUMENTS

| | | | |
|---|---|---|---|
| 288,080 A | 11/1883 | Date et al. | |
| 977,773 A | 12/1910 | Atkins | |
| 1,420,465 A * | 6/1922 | Arnold | 111/25 |
| 2,141,044 A | 12/1938 | Rassmann et al. | |
| 2,770,400 A | 11/1956 | Mattson et al. | |
| 3,923,206 A | 12/1975 | Gillies et al. | |
| 5,676,072 A * | 10/1997 | Williames | 111/105 |
| 7,497,173 B1 * | 3/2009 | Walker et al. | 111/92 |
| 2007/0232465 A1 * | 10/2007 | Puzey | 482/110 |

FOREIGN PATENT DOCUMENTS

JP 200521026 A * 1/2005

* cited by examiner

*Primary Examiner*—Christopher J. Novosad
(74) *Attorney, Agent, or Firm*—Egbert Law Offices PLLC

(57) ABSTRACT

An apparatus for uniformly planting seeds into the earth that can accommodate a even a small quantity of any size seed. An embodiment of the apparatus has a frame, at least one wheel affixed to the frame, and a conveyor belt mounted to the frame. The conveyor belt is connected to the wheel or wheels such that it moves in relation to the rate of rotation along the earth of the wheel or wheels. The conveyor belt has a surface on a top thereof suitable for receiving seeds. A seed box is hingedly affixed to the frame and is movable from a first position over the conveyor belt to a second position away from the conveyor belt. In the first position, the seed box allows seed and soil mixture to be uniformly placed on the conveyor belt.

7 Claims, 4 Drawing Sheets

GARDEN SEED PLANTING APPARATUS

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to gardening. More particularly, the present invention relates to the planting of seeds in a garden. Even more particularly, the present invention relates to a seed planter apparatus for a home garden that can distribute even a small quantity of any size seed uniformly over a seed row.

2. Description of Related Art Including Information Disclosed Under 37 CFR 1.97 and 37 CFR 1.98

In planting some vegetables, the seeds must be positioned in the furrows in regularly and uniformly spaced relation. Ideally, each seed should be at least a predetermined distance from the adjacent seeds to provide for proper growth thereof, and the seeds must be as close together as possible to provide maximum use of the home garden or acreage. Although many types of seed separators are employed with various types of planters, many of these separators do not provide a positive control of the rate of feeding of individual seeds from the planter to the furrow in the ground.

Due to the recent green movement, rising food prices, and heightened consumer interest in healthy foods, more and more individuals are maintaining home gardens. These gardens can range from small elevated gardens to more extensive operations involving numerous rows and a wide variety of vegetables. Such home gardens can require extensive time commitment. One of the most time consuming tasks related to home gardening is the planting of seeds.

In the past, various patents have been issued relating to seed planters and similar apparatus for evenly distributing seeds in a furrow. For example, U.S. Pat. No. 2,770,400 issued on Nov. 13, 1956 to Mattson et al. describes a seed separating and feeding mechanism. The seed planter has a frame and a seed carrying hopper. A flat seed conveyer belt is secured to a driving element, and delivers seeds to a delivery means on the frame which is operatively connected to the conveyer for receiving the seeds therefrom and delivering the seeds to the ground for planting.

U.S. Pat. No. 3,923,206 issued on Dec. 2, 1975 to Gillies et al., describes a seed separator with adjustment capability for different seed sizes. The seed separator has a seed spacing means wherein a single row or plurality of rows of spaced apart seed may be sown with pre-determined spacing along the rows and when sowing a plurality of rows per single run. Pre-determined spacing is provided between the rows and a plurality of seed spacing means may be coupled in side-by-side relationship or in a tandem array to increase the area of coverage per single run. The seed is sown at regular pre-selectable depths.

U.S. Pat. No. 2,141,044 issued on Dec. 20, 1938 to Rassmann et al., describes a hill dropping seeder. The hill dropping seeder is particularly adapted for dropping seeds in hills such as sugar beets and the like, where it is desirable that the hills be spaced equally apart to facilitate the harvesting of the beets when they are mature. A feature resides in the simple construction of the seeder which does not need a separate feeding mechanism to meter out the seed as was used in the prior art because the same is designed with a belt which travels across the bottom of the seed supply picking up the seed.

U.S. Pat. No. 977,773 issued on Dec. 2, 1910 to Atkins, describes a guano distributor. The guano distributor is a type of fertilizer distributor. The distributor can be filled without the disadvantage of having the fertilizer falling from the bottom of the hopper during the filling. The fertilizer is fed from the hopper by a screw or worm conveyer to the feed spout. The distributor has a frame with a handle similar to a lawnmower for moving the distributor along the desired area.

U.S. Pat. No. 288,080 issued on Nov. 6, 1883 describes a seed planter. The seed planter can distribute two kinds of seed at one time, if so desired, or to distribute seed and at the same time a fertilizer. The seed planter has a rectangular frame and a seed box mounted thereon. The seed box has two compartments. Belts that are driven by the wheels of the seed planter serve to turn a gear within the hopper for distributing the seeds.

It is an object of the present invention to provide a seed planting apparatus that uniformly distributes even a small quantity of seeds in a row.

It is another object of the present invention to provide a seed planting apparatus that is adjustable so as to accommodate various row lengths.

It is another object of the present invention to provide a seed planting apparatus that can accommodate any size of seed.

It is another object of the present invention to provide seed planting apparatus that is inexpensive to manufacture.

It is a further object of the present invention to provide a seed planting apparatus that is simple to use and well suited for the home gardener.

These and other objects and advantages of the present invention will become apparent from a reading of the attached specification and appended claims.

BRIEF SUMMARY OF THE INVENTION

The present invention is an apparatus for planting seeds into the earth having a frame, at least one wheel affixed to the frame, and a conveyor belt mounted on the frame. The conveyor belt is connected to at least one wheel such that it moves in relation to the rate of rotation along the earth of the at least one wheel. The conveyor belt has a surface on a top thereof suitable for receiving the seeds. The apparatus may further include a first belt drive affixed to the at least one wheel, a second belt drive affixed to the conveyor belt and a drive belt extending between said first belt drive and said second belt drive. The second belt drive has a diameter greater than the diameter of the first belt drive.

In the present invention, a seed box may be hingedly affixed to the frame adjacent the conveyor belt. The seed box has a slot formed therethrough. The seed box is movable from a first position over the conveyor belt to a second position away from the conveyor belt. The first position allowing the seeds to be placed onto the conveyor belt through the slot. The apparatus may further include a plurality of indicia formed on the frame adjacent the conveyor belt. The plurality of indicia are indicative of a distance that the at least one wheel has moved along the earth. Additionally, the apparatus may include a packer wheel affixed to the frame on an opposite side of the frame from the at least one wheel. The packer wheel is in alignment with the conveyor belt.

In the present invention, the at least one wheel may include a first wheel, a second wheel positioned in spaced relation to the first wheel, and an axle connected to the first and second wheel. The conveyor belt is interconnected to the axle. The apparatus may further include an opening in the frame adjacent the front side of the conveyor belt, and a furrow opener extending downwardly from the frame adjacent the front end of the conveyor belt. Additionally, the apparatus of the present invention may include a marker, such as a clothespin, that is attachable to the conveyor belt. The marker is for marking a position on the conveyor belt corresponding to the distance that the at least one wheel travels along the earth. A seed mixture may be applied to the surface of the conveyor belt. The seed mixture includes a plurality of seeds mixed with soil in a predetermined ratio.

DETAILED DESCRIPTION OF THE INVENTION

Figure 1:
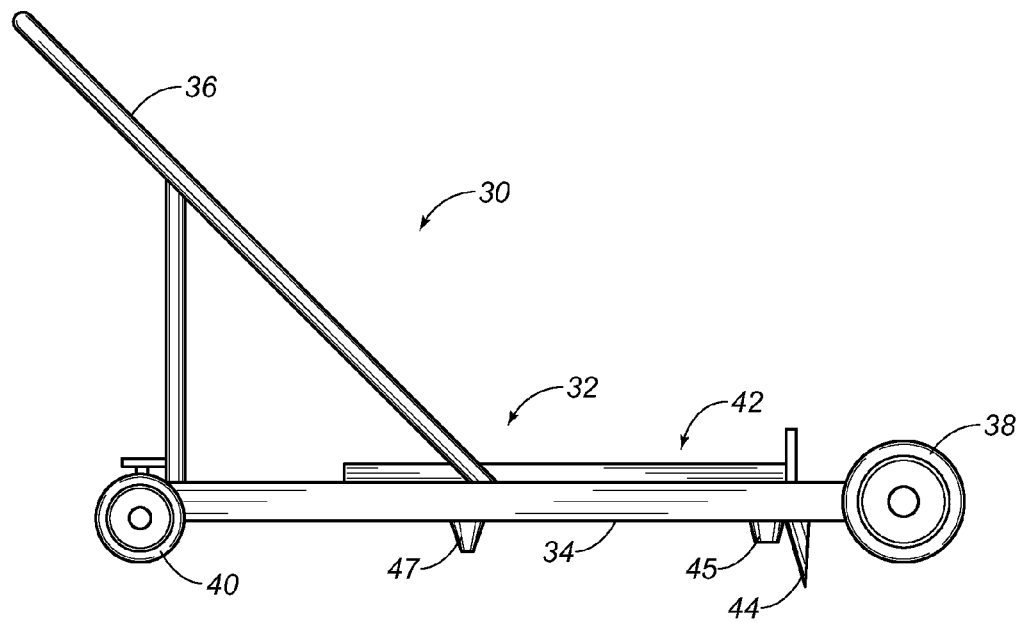
FIG. 1 is a side view of the seed planter apparatus of the present invention.

Referring to FIG. 1, there is shown a side view of the seed planter apparatus 30 of the present invention. The seed planter apparatus 30 has a frame 32. The frame 32 has a base 34 and a handle 36 extending upwardly therefrom. The handle 36 is used by the operator to advance seed planter apparatus 30 along a row for planting seeds. The handle 36 can have a configuration similar to a conventional push lawn mower. Affixed to the frame are the front wheels 38. The front wheels 38 consist of two spaced apart wheels used for guiding the seed planter apparatus 30 along the seed row. Additionally, a packer wheel 40 is positioned on the read end of the base 34 of the frame 32. The packer wheel 40 can be of a smaller size than the front wheels 38, and is used to pack the seeds and dirt within the furrow of the seed row.

The seed planter apparatus 30 also has a seed distribution mechanism 42 for distributing a seed and soil mixture. The seed distribution mechanism 42 is shown in greater detail in the subsequent figures. Below the seed distribution mechanism 42 is shown the down spout 45 and furrow opener 44. First, the furrow opener 44 serves as a plowing mechanism to remove dirt from the seed row. The down spout 45 serves the purpose of guiding the seed and soil mixture from the seed distribution mechanism 42 into the opened furrow. The furrow opener 44 may extend to a depth below the bottom surface of the front wheels 38. A furrow closer 47 may also be attached to the frame 32 at a position between the packer wheel 40 and the down spout 45.

Figure 2:
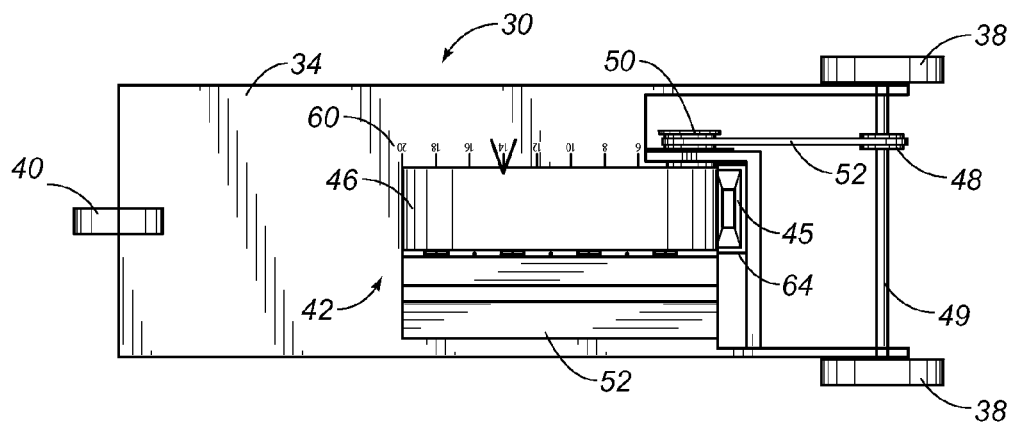
FIG. 2 is a top view of the seed planter apparatus of the present invention.

Referring to FIG. 2, there is a top view of the seed planter apparatus 30 of the present invention. In FIG. 2, the handle 36 is not shown. In FIG. 2, the configuration of the seed distribution mechanism 42 and its connections with the front wheels 38 is more clearly shown. An axle 49 extends between the two spaced apart front wheels 38. Affixed over the axle 49 is the first belt drive 48. A "V" belt 52 is positioned over the first belt drive 48 and connects to the second belt drive 50. The second belt drive 50 is in turn connected to the flat conveyor belt 46. The second belt drive 50 has a greater diameter than the first belt drive 48. As the seed planter apparatus 30 is moved along a row, the front wheels 38 turn the first belt drive 48 which in turn turns the second belt drive 50. The second belt drive 50 serves to turn the conveyor belt 46. As the seed planter apparatus 30 is advanced, the conveyor belt 46 advances in the direction of the front wheels 38. Adjacent the conveyor belt 46 are the indicia 60. The indicia 60 are shown more clearly in subsequent figures. On the opposite side of the conveyor belt 46 from the indicia 60 is the seed box 54. In FIG. 2, the seed box 54 is shown hinged away from the conveyor belt 46. An opening 64 is formed through the base 34 of the frame 32, which allows for the seed and soil mixture to be distributed towards the down spout 45. FIG. 2 also shows how the packer wheel 40 extends outwardly from the base 34 of the frame 32. The packer wheel 40 is positioned in alignment with the conveyor belt 46 so as to be aligned with the seed and soil mixture deposited in the opened furrow.

Figure 3:
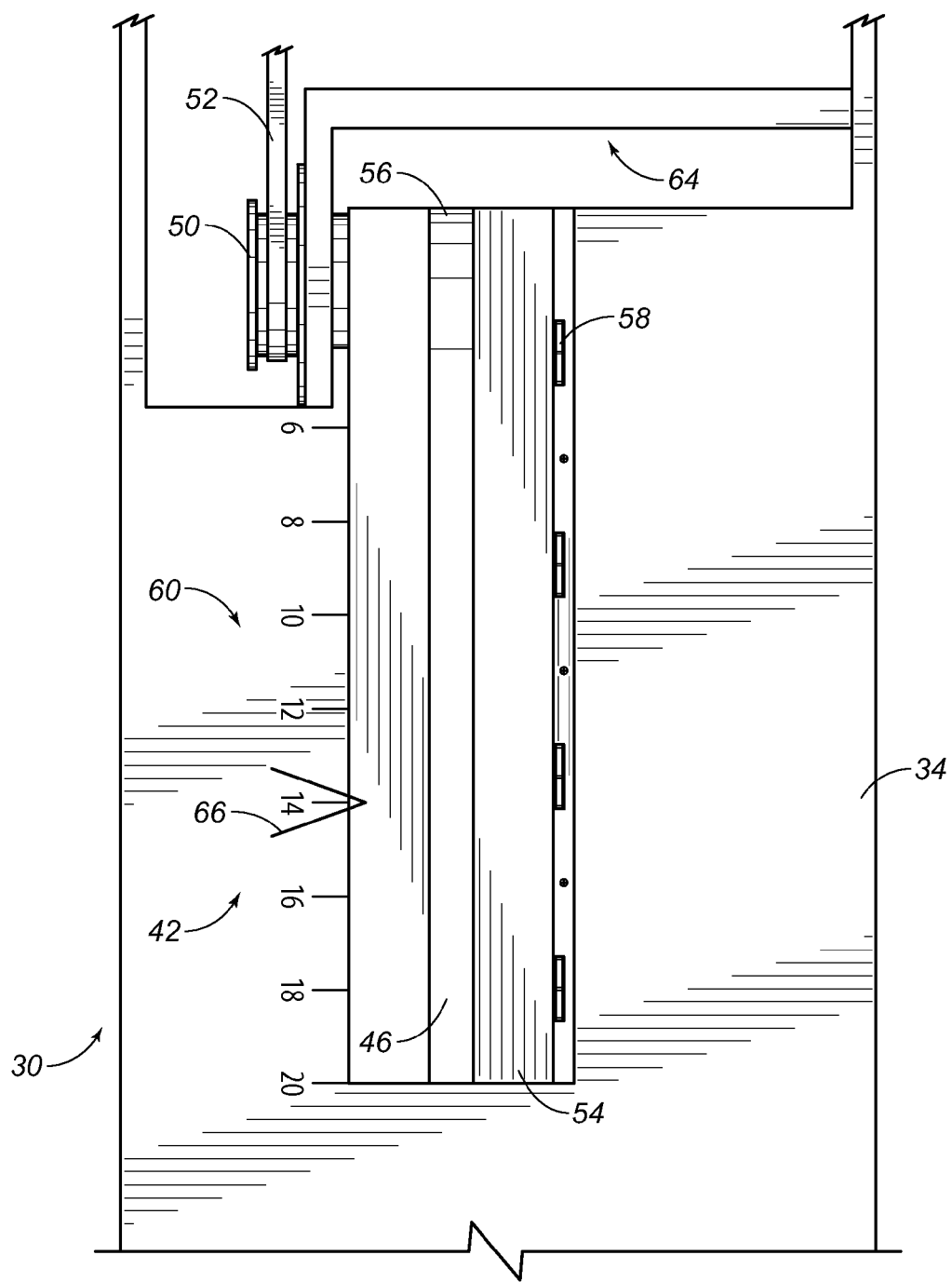
FIG. 3 is an isolated view of the seed planter apparatus of the present invention wherein the seed box is in a position over the conveyor belt.

Referring to FIG. 3, there is shown an isolated view of the distribution mechanism 42 where the seed box 54 is in a first position. In this first position, the seed box 54 is in a position overlying the conveyor belt 46 and centered thereon. The seed box 54 is connected to a hinge 58 which is affixed to the base 34 of the frame 32. Importantly, the seed box 54 has a downwardly sloping slot 56 with a channel therethrough, which opens over the conveyor belt 46. The seed box 54 is positioned over the conveyor belt 46 so as to allow a gardener to introduce seeds into the seed box 54 and slot 56 thereof. The seed and dirt mixture travels through the slot 56 and onto the conveyor belt 46. Because of the nature of the slot 56, the seed and dirt mixture is placed on the conveyor belt 46 in a uniform manner for distribution into the seed furrow.

In FIG. 3, the indicia 60 are also shown. Indicia 60 are numbered 6 through 20 as you move away from the opening 64 at the front of the conveyor belt 46. The indicia 60 indicate the length of a garden row that the gardener desires to distribute seeds into. Some gardens can have seed rows of varying lengths. For example, a gardener may have a seed row of approximately fourteen feet. Using this information, the gardener may place the length-of-row divider, indicated in FIG. 3 by reference numeral 66, at the indicia 14. Subsequently, the gardener can fill the seed box 54 from the indicia 0 at the front of the conveyor belt 46 to the length-of-row divider 66 located at indicia 14. Once the seed box 54 is moved away from the conveyor belt 46, the fourteen foot row is ready to be seeded. The present invention contemplates lengths of rows beyond 20 feet.

Figure 4:
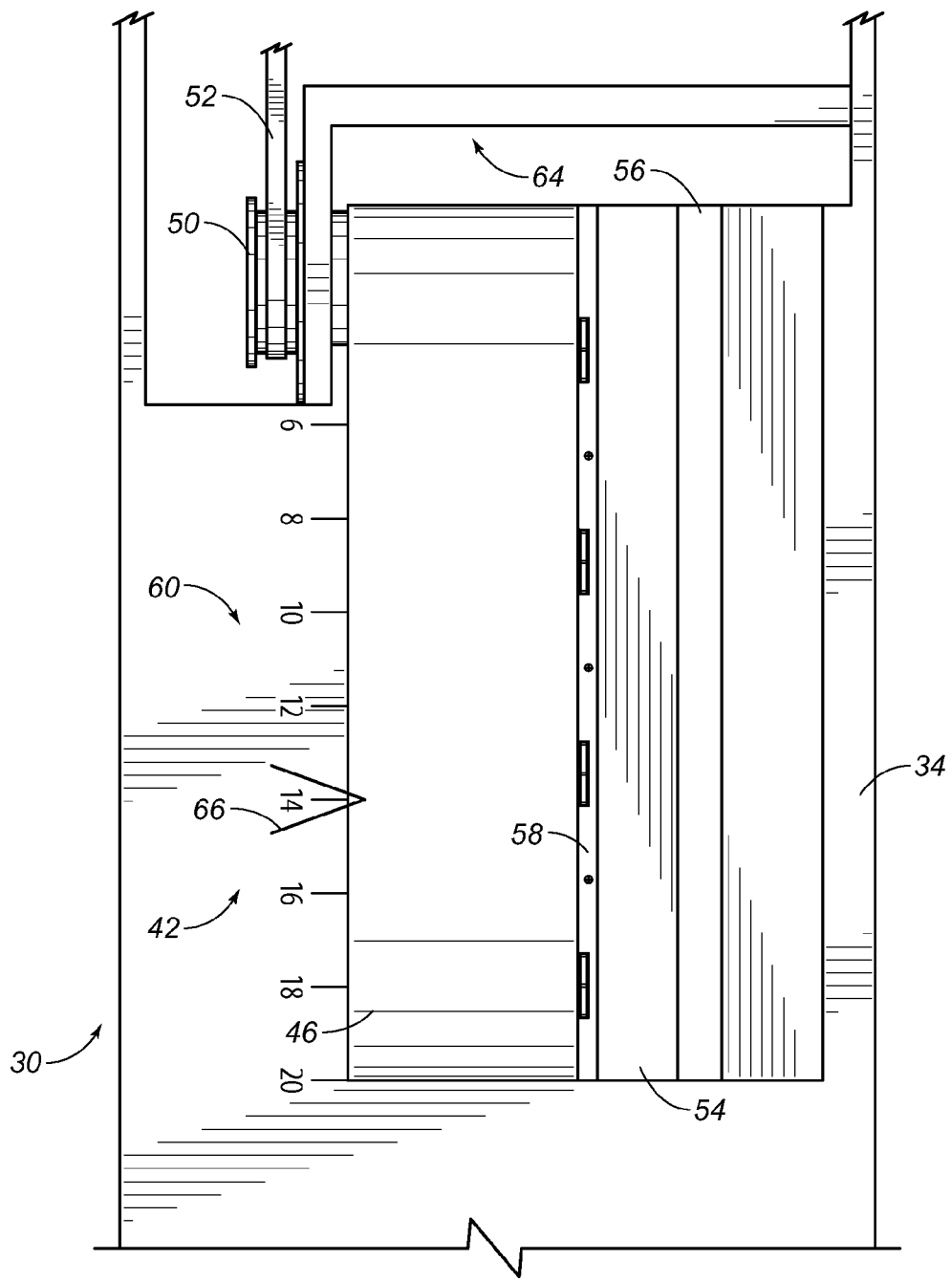
FIG. 4 is an isolated view of the seed planter apparatus of the present invention wherein the seed box is moved away from the conveyor belt.

Referring to FIG. 4, there is shown a second isolated view of the seed planting mechanism 42. In FIG. 4, the seed box 54 is hinged away from the conveyor belt 46. In FIG. 4, the seed and soil mixture 62 has been poured through the slot 56 of the seed box 54 and onto the conveyor belt 46. Thus, the seed planter apparatus 30 is prepared for planting the seed and soil mixture 62 along a fourteen foot seed row. The seed box 54 is hinged away from the conveyor belt 46 so as to allow the conveyor belt 46 to be advanced without interference.

Figure 5:
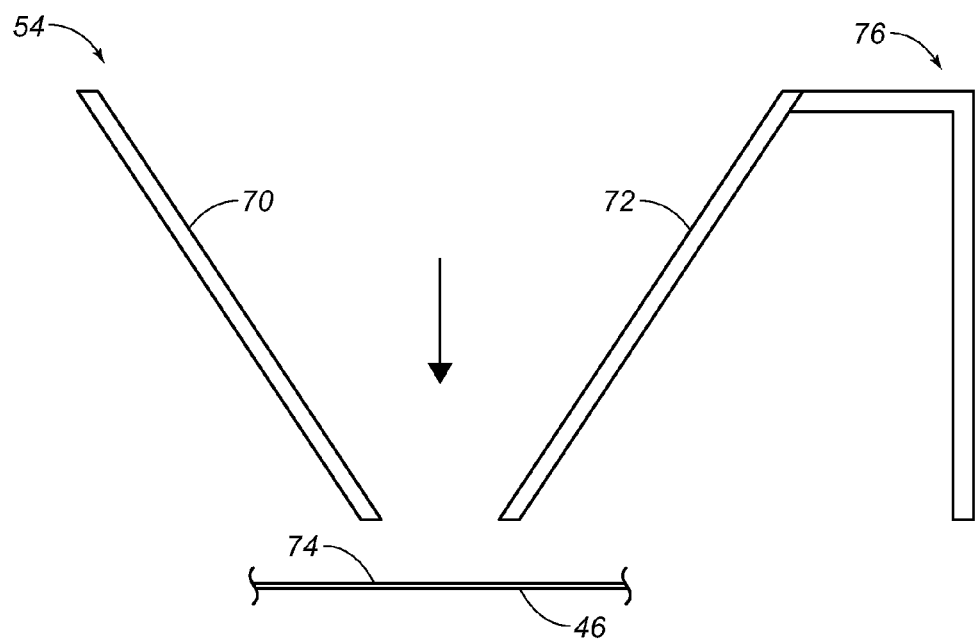
FIG. 5 is a cross-sectional view of the seed box of the present invention.

Referring to FIG. 5, there is shown a schematic view of one embodiment of the seed box 54 of the present invention. Importantly, it can be seen that the seed box 54 has opposing walls 70 and 72. The opposing walls 70 and 72 are appropriately sloped so as to guide the seed and soil mixture toward the surface 74 of the conveyor belt 46. FIG. 5 shows one possible embodiment of the seed box 54 where it is hinged at point 76 and can be moved about this point 76 to the position away from the conveyor belt 46.

The ratio of the first belt drive 46 and the second belt drive 50 is set such that when the seed planter apparatus 30 is advanced for fourteen feet along the seed row, the conveyor belt 46 is advanced such the seed and soil mixture 62 adjacent the indicia 14 is deposited into the down spout and furrow opener 44 at the end of the fourteen foot seed row. This allows the seed and soil mixture 62 to be applied in a uniform manner along the seed row. Essentially, the conveyor belt 46 moves very slowly in relation to the front wheels 38.

The seed planter apparatus 30 also allows for a measurement of a seed row without the use of a tape measure or a similar instrument. The seed planter apparatus 30 can be positioned at the end of a seed row and the clothes pin 66 or other marking device can be placed on the conveyor belt adjacent the down spout and furrow opener 44. The seed planter apparatus 30 can then be backed up along the row to the beginning of the row. The final location with respect to the indicia 60 of the clothes pin or other marking device 66 when the seed planter apparatus 30 is at the beginning of the row indicates the length of the row.

The seed planter apparatus 30 of the present invention can accommodate any quantity of seed, any size of individual seeds, and distribute them uniformly in any length of row. In the present invention, the seed is diluted with a certain amount of soil or dirt in prescribed or predetermined quantities so as to gain control of the predictable result as the seed box is filled.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An apparatus for planting seeds into the earth in a uniform manner comprising:
   a frame;
   at least one wheel affixed to said frame;
   a conveyor belt mounted on said frame, said conveyor belt connected to said at least one wheel such that said conveyor belt moves in relation to a rate of rotation of the wheel along the earth, said conveyor belt having a surface on a top thereof suitable for receiving the seeds; and
   a seed box hingedly affixed to said frame adjacent said conveyor belt, said seed box having a slot formed therethrough, said seed box movable from a first position over said conveyor belt to a second position away from said conveyor belt, said first position allowing the seeds to be placed onto said conveyor belt through said slot.

2. The apparatus of claim 1, further comprising:
   a first belt drive affixed to said at least one wheel;
   a second belt drive affixed to said conveyor belt, said second belt drive having a diameter greater than a diameter of said first belt drive; and
   a drive belt extending between said first belt drive and said second belt drive.

3. The apparatus of claim 1, further comprising:
   a plurality of indicia formed on said frame adjacent said conveyor belt, said plurality of indicia being indicative of a distance that said at least one wheel has moved along the earth.

4. The apparatus of claim 3, further comprising:
   a marking means attachable to said frame, said marking means for marking a position on said conveyor belt corresponding to a distance that said at least one wheel travels along the earth.

5. The apparatus of claim 1, further comprising:
   a packer wheel affixed to said frame on an opposite side of said frame from said at least one wheel, said packer wheel being in alignment with said conveyor belt.

6. The apparatus of claim 1, said at least one wheel comprising:
   a first wheel;
   a second wheel positioned in spaced relation to said first wheel; and
   an axle connected to said first wheel and said second wheel, said conveyor belt being interconnected to said axle.

7. The apparatus of claim 1, further comprising:
   an opening in said frame adjacent a front side of said conveyor belt; and
   a furrow opener extending downwardly from said frame adjacent said front end of said conveyor belt.

* * * * *